Dec. 29, 1970 J. T. MAYNARD 3,551,782
BIDIRECTIONAL POWER CIRCUIT HAVING CROSSOVER CONTROL MEANS
Filed April 18, 1968 2 Sheets-Sheet 2
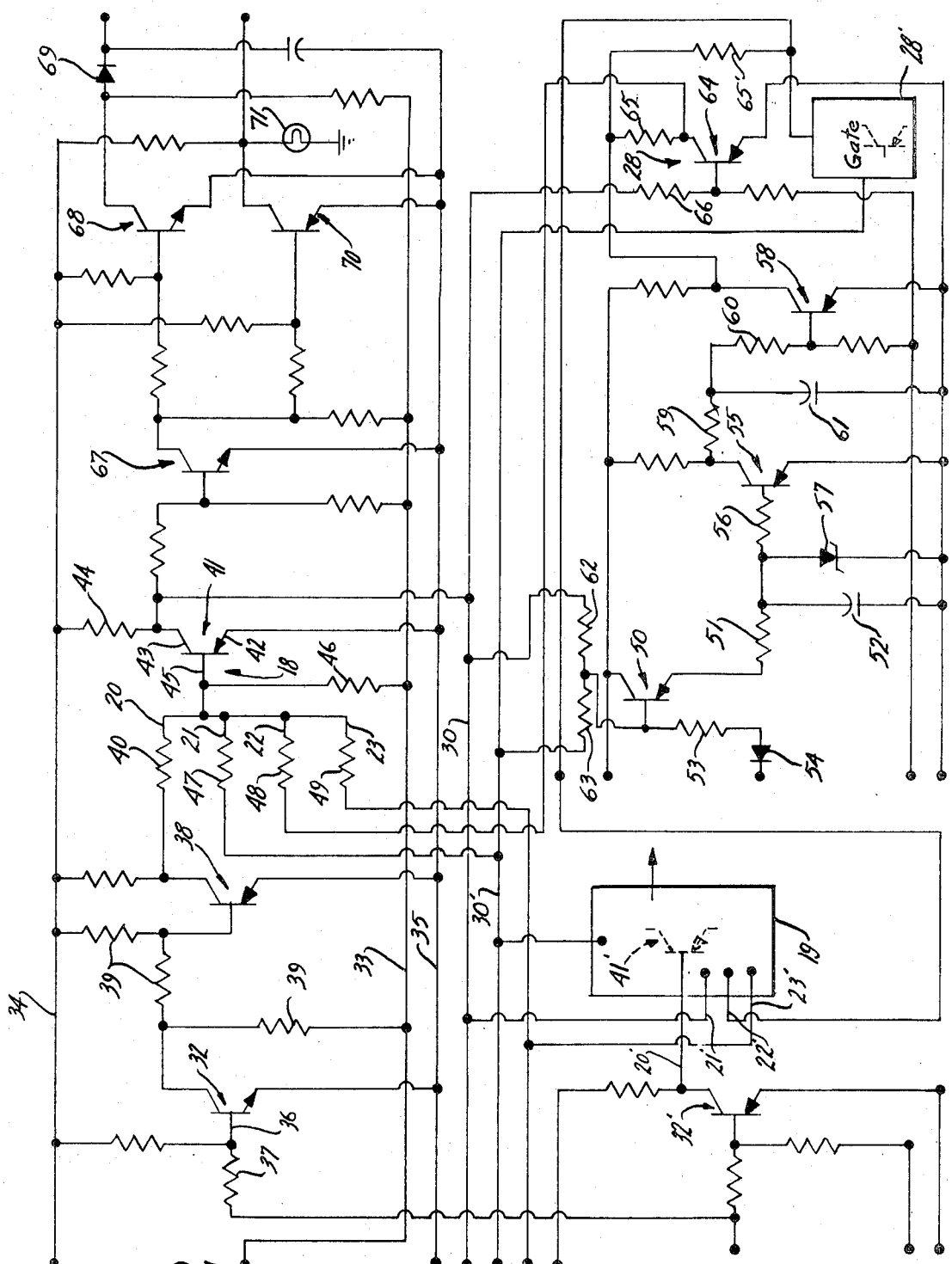
FIG_2
INVENTOR
JOHN T. MAYNARD
BY
Andrus & Clarke
Attorneys

United States Patent Office 3,551,782
Patented Dec. 29, 1970

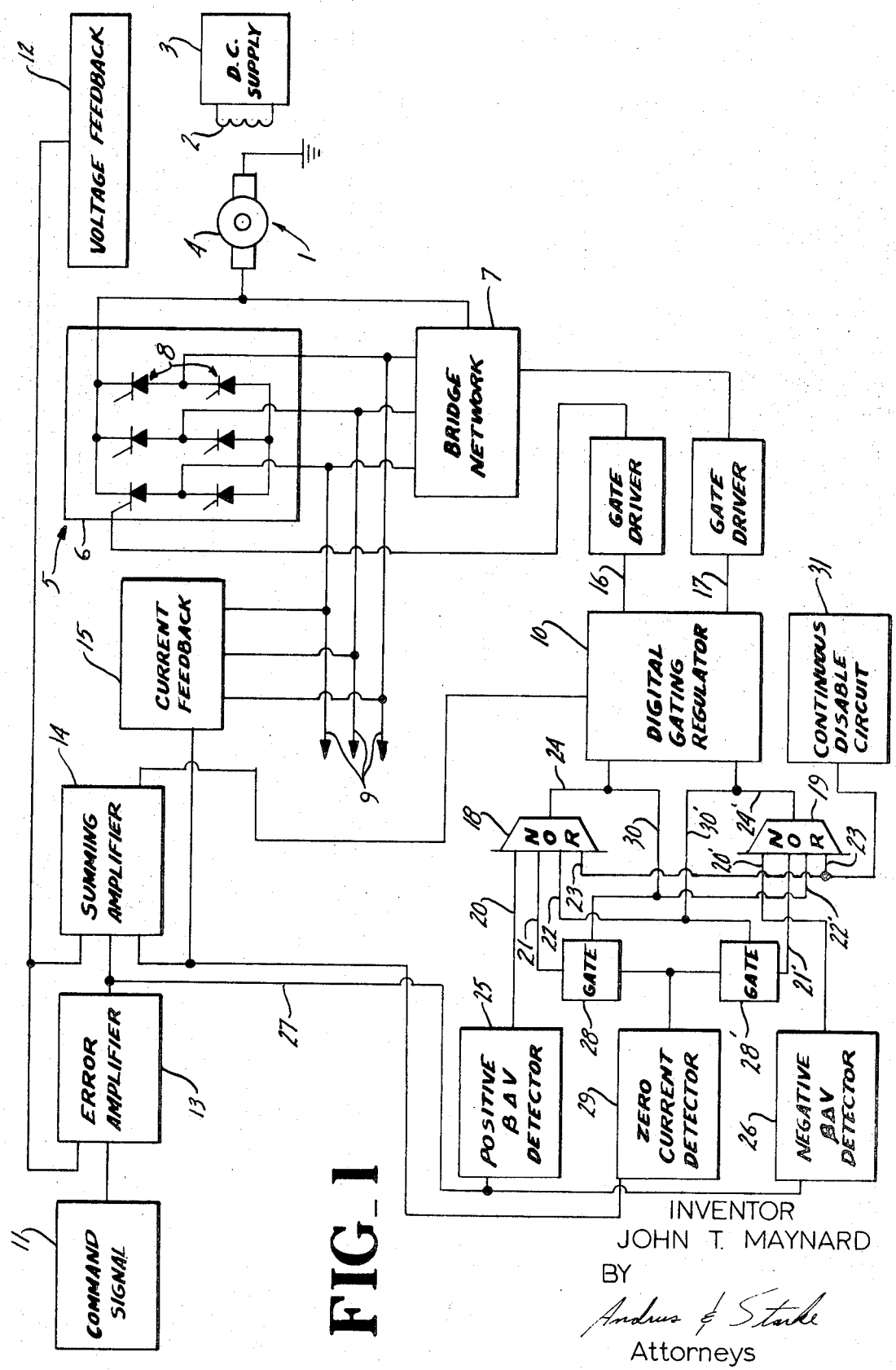

3,551,782
BIDIRECTIONAL POWER CIRCUIT HAVING CROSSOVER CONTROL MEANS
John T. Maynard, New Berlin, Wis., assignor to A. O. Smith Corporation, Milwaukee, Wis., a corporation of New York
Filed Apr. 18, 1968, Ser. No. 722,413
Int. Cl. H02m 1/18; H02p 1/22
U.S. Cl. 321—13
6 Claims

ABSTRACT OF THE DISCLOSURE

A pair of oppositely polarized full wave rectifiers connect a reversible D.C. motor to a three-phase source. Each leg of the bridges includes a silicon-controlled rectifier with the latter phase controlled in accordance with an input voltage and an armature voltage feedback to a closed loop servo to provide motoring or regenerating operation. A digital gating regulator and associated gate driver are controlled by the output of an error amplifier in the servo. A logic circuit selectively enables the regulator and gate drives to actuate one rectifier and including two "nor" logic transistors each having a plurality of inputs and a digital output to selectively enable and disable the bridge networks. A zero current detector interconnected to the incoming power supply lines, a pair of polarity detectors connected to an error amplifier, and a fault detector provide logic inputs to a selected "nor" logic transistor to actuate the regulator and enable a corresponding bridge network.

---

A cross-over control includes a pair of "nor" logic transistors, each having a plurality of inputs and a digital signal output for positively enabling or disabling the corresponding bridge rectifier. A zero current detector is interconnected to the incoming power supply lines and provides a common zero motor current signal simultaneously applied to corresponding inputs of the two "nor" circuits via individual transistor gates. The gates are conjointly controlled by the detector and by an output signal from the corresponding "nor" unit.

The polarity detectors are separately connected to corresponding "nor" transistors and the output of each "nor" transistor is interconnected as an input to the opposite transistor.

A fault detector is also provided and connected as a fourth logic input to both "nor" transistors.

A bridge rectifier is enabled when all of the logic signals to a coeresponding logic transistor are the same such that only one bridge is on at a time and a new bridge cannot conduct before a previous bridge is disabled.

This invention relates to a bidirectional power or energizing circuit having crossover control means and particularly to such a circuit having a pair of triggered polarized switch means connected in parallel with each other between a power supply and a load.

Various electrical loads may be energized through different input circuits connected to the load in parallel. The power to direct current loads may be supplied through rectifying units connected to suitable alternating current input means. When full wave rectification is provided, however, paralleled rectifying units constitute a short circuit condition across the load if both are simultaneously conditioned to conduct. The short circuit currents would normally be such as to destroy the rectifying components and the associated circuitry or associated components. Such a condition, of course, is completely unacceptable from a practical standpoint. Therefore, it is generally necessary to provide means to insure conduction of a single rectifying unit.

The present invention has been particularly applied to the control of the reversible direct current motor such as disclosed in applicant's copending application entitled "Dynamoelectric Control Circuit," which was filed on March 14, 1968 with Ser. No. 713,247, and which is assigned to a common assignee herewith. Generally, as more fully disclosed in such application, the armature of a direct current motor is connected to a power supply through a pair of paralleled three-phase full-wave bridge rectifiers employing silicon controlled rectifiers. The motor torque is controlled by controlling the direction and magnitude of the armature current. The silicon controlled rectifiers are phase controlled switch means for applying selected portions of the alternating current input to the motor. The control circuit for actuating the rectifiers includes a feedback servosystem generating an error signal proportional to the difference between a command signal and a feedback signal. The error signal is connected to actuate a gating regulator which is adapted to produce a pulse train simultaneously applied to controlled rectifiers of both bridge circuits. A pair of polarity detectors are also energized by the error signal and control the bridges to enable one of he bridges while disabling of the other bridge.

The present invention is directed to a control including a cross-over means to positively prevent simultaneous turn-on of both bridge units or circuits to thereby permit safe switching from one bridge circuit to the other.

The present invention is particularly directed to an improved means employing a logic control circuitry to sense the presence of any circuit in the supply connection to the load and to positively prevent enabling of either of the rectifying units when the control signals a change from a previously conducting unit to the non-conducting unit. This allows proper firing of the rectifier units for both motoring and regenerating modes of operation of the motor.

Generally, in accordance with the present invention, the energizing circuit includes a pair of full wave, rectifier units interconnected to the load in parallel with one rectifier unit providing current in one direction and the other bridge conducting current in the opposite direction with respect to the load. In accordance with the present invention, a trigger control means is provided for firing or triggering of the rectifier units and includes a logic circuit means having a plurality of inputs for sensing the presence of current in either of the bridge circuits and operable to prevent enabling of either bridge until such time as the current is zero. Multiple input logic circuitry also permits interconnection of the polarity detectors to enable one bridge and disable another, as well as providing for other fault sensing, for example, improper phase sequencing of the controlled rectifiers.

Generally, in accordance with the preferred construction of the present invention, a cross-over control network includes a pair of "nor" logic circuit units or the like having a plurality of inputs and each having an output with a digital signal for positively enabling or disabling the corresponding rectifier unit. A zero current detector is interconnected to the power supply lines connected to the rectifier units to provide a common zero current signal simultaneously applied to corresponding inputs of the two "nor" circuits via individual electrical gates. The gates are conjointly controlled by the detector and by an output signal from the corresponding "nor" unit. Polarity detectors are connected in common to the output of an error operational amplifier of the servoloop and separately connected to corresponding "nor" units. The output of each "nor" unit is interconnected as an input to the opposite "nor" unit to provide an interlock insuring that a single rectifier unit is enabled at any one time.

A fault detector may also be provided to monitor one or more circuits or other conditions and connected as a fourth logic input to both "nor" units.

In order to enable a rectifier unit, "nor" circuits must have four properly related input conditions created simultaneously by the polarity detectors, the zero current detectors, the fault detector and the interlock between the "nor" units. As a result of the interlock and the polarity detection, the proper conditions can only be met at one "nor" unit and then only when essentially zero armature current is flowing in the supply lines.

The drawings furnished herewith illustrates a preferred construction of the present invention in which the above advantages and features are clearly disclosed, as well as others which will be readily understood from the following description of the drawing.

FIG. 1 is a block diagram of a motor control circuit employing the present invention; and FIG. 2 is a schematic circuit diagram of certain components shown in FIG. 1 to clearly illustrate a preferred novel construction of the present invention.

Referring to the drawing, and particularly to FIG. 1, the present invention is shown in a closed loop control for a direct current shunt motor 1 of a known construction. The motor 1 is diagrammatically illustrated with a field 2 connected to a suitable D.C. excitation source 3. An armature 4 is rotatably mounted within the field 2 and is connected to a direct current power supply circuit 5 which includes a pair of gated or phase controlled bridge networks 6 and 7. The bridge network 6 provides a forward armature current, while bridge network 7 provides a reverse armature current. The networks 6 and 7 are similarly constructed and each includes a plurality of silicon controlled rectifiers 8, or the like, which are interconnected in a known, three-phase full-wave bridge circuit. The networks 6 and 7 are connected in parallel to the armature 4 and have an input interconnected in parallel to the three-phase power supply lines 9. A digital gating regulator 10 forms a part of a feedback circuit and is constructed to produce firing pulse signals to proper pairs of rectifiers 8 of the networks 6 and 7 to apply a controlled portion of each half cycle of the alternating current input to the armature 4. Generally, the illustrated feedback circuitry, as shown in FIG. 1, is a simplified illustration of the circuit shown in applicant's previously identified copending application and includes a command signal unit 11 adapted to provide a direct current signal proportional to a desired armature current. A voltage feedback signal unit 12 is coupled to the armature 4 and provides a voltage signal proportional to the applied voltage of the armature. The signals from the units 11 and 12 are connected to an error operational amplifier 13 to provide an amplified direct current signal having a polarity related to the necessary current direction in the motor armature. The output of the operational amplifier 13 is fed into a summing operational amplifier 14 which has additional inputs connected respectively to the voltage feedback unit 12 and to a current feedback unit 15 connected in the three-phase alternating current input lines 9. The summing operational amplifier unit 14 provides a summated or compensated error signal which is proportional to the error signal and the counterelectromotive force of the motor 1. The output of the summing operational amplifier 14 is connected to actuate the digital gating regulator. As more fully disclosed in applicant's copending application, the use of the summing operational amplifier 14 produces a zero current gating such that the rectifiers are fired to supply power to the armature only in accordance with an error signal essentially independent of the counterelectromotive force voltage.

The present invention is particularly directed to a control system to insure proper triggering of the bridge networks 6 and 7 and to positively prevent cross-over from one bridge network to the other unless the current from the armature 4 by a conducting bridge has descreased to essentially zero. In accordance with the illustrated embodiment of the present invention, the digital gating regulator 10 has a pair of output lines 16 and 17, one for bridge network 6 and the opposite for bridge network 7. One, and only one, of the two lines 16 and 17 is operative in accordance with the output of a logic control including a pair of logic circuits 18 and 19, one for each of the lines and shown in FIG. 1 in block diagram and schematically in FIG. 2 as "nor" logic units. Each of the "nor" logic units 18 and 19 is similarly constructed and consequently, only the unit 18 is described in detail with the corresponding elements of the other unit being identified by corresponding primed numbers in both FIGS. 1 and 2.

The "nor" logic unit 18 includes four separate input lines 20, 21, 22 and 23 and an output line 24. In accordance with the conventional logic notation, the signal inputs and output are similarly identified by a binary logic "1" or "0." The illustrated "nor" logic circuit of FIG. 2 is such that if any one of the inputs is at "1," the output is "0." The output rises to a "1" output only if each and every input at the four input lines 20–23 is at "0."

The first input line 20 is interconnected to one of a pair of polarity detectors 25 and 26 which have their inputs connected in common to the output of the error operational amplifier 13 via line 27. The detector 25 connected to the input of the "nor" logic unit 18 is shown as a positive error signal detector. The second detector 26 is a negative error signal detector and is connected to the corresponding input line 20' of the "nor" logic circuit 19. The error detectors 25 and 26 are suitable polarity sensing devices providing an output only when the related polarity appears at its input. The first input line 20 of the "nor" logic circuit 18 is at "1," unless a positive error signal is present at line 27, at which time a "0" appears at the first input line.

The second input line 21 is interconnected through a logic gate 28 to a common zero current detector 29 which is simlarily interconnected to a corresponding input line 21' of the "nor" logic circuit 19. The zero current detector 29 is connected to the current-sensing unit 15 in the input lines 9 to the bridge networks 6 and 7. If either of the bridge networks 6 or 7 is conducting current from or to the power supply, a current signal is applied to the zero current detector 29, the output of which is interconnected through the gate 28 to the second input lines of the "nor" logic units 18 and 19. When, and only when, the current is essentially at zero will the output of the zero current detector establish a "0" at the corresponding inputs of the "nor" logic units 18 and 19.

The gate 28 is also interconnected to a feedback line 30 from the output of the coresponding "nor" logic unit 18. This provides an interlock to hold the "nor" logic unit 18 in an enabling position after it is initially enabled to produce a logic "1" output.

The third input line 22 is interconnected to the feedback line 30' of the opposite "nor" logic unit 19 such that the opposite "nor" logic unit 19 must be disabled before unit 18 can be enabled. Thus, if the logic unit 19 is enabled, a logic "1" output therefrom is fed back via line 30'. Only if "nor" logic unit 19 is disabled and has a "0" output, can the corresponding third input line 22 be at "0."

The fourth input line 23 is shown connected to a continuous disable circuit or unit 31 which is similarly connected to the corresponding input 23' of the "nor" logic unit 19. The continuous disable circuit 31 responds to a selected abnormal fault condition and positively hold off or prevents firing of either one of the networks 6 and 7 until the fault condition has been corrected. For example, a phase sequencing circuit, not shown, may be provided to sense the connection of the lines 9 to the networks 6 and 7. If an abnormal connection is made, a signal is created by the continous disable circuit 31 to positively prevent energizing of the motor until such time as the abnormal connection has been corrected.

The output of the two "nor" logic circuits or units 18 and 19 are interconnected into the digital gating regulator 10 to selectively control the firing of the bridge rectifier networks 6 and 7.

Referring particularly to FIG. 2, a schematic circuit diagram of detectors 25, 26 and 29 and "nor" logic unit 18 is shown.

The illustrated circuit discloses solid state logic employing PNP logic wherein the logic "1" is related to a negative potential and logic "0" is relative positive potential.

Referring particularly to FIG. 2, the positive error signal detector 25 is shown as an NPN transistor 32 interconnected in a common emitter configuration to a set of three incoming DC biased power lines including a positive line 33, a negative line 34 and a reference or ground line 35. The base 36 is connected to the negative power supply and positively biased off. The base 36 is also connected through a coupling resistor 37 to the error signal line 27. When the error signal is positive, it provides an on-bias to the transistor 32 and produces a logic "0" at the collector.

The collector is coupled to a logic inverter transistor 38. Transistor 38 is connected in a common emitter configuration with a plurality of bias resistors 39 connected to bias the transistor off. The detector transistor 32 is connected across the one bias resistor 39 connected to positive line 33 such that when it conducts, the input to transistor 38 drives it into conduction, establishing a logic "0" output and thereby signalling a positive error signal which has been established by the operational error amplifier 13. This provides a first condition for the "nor" logic circuit 18 to produce a proper bridge enabling output.

The negative polarity detector 26 employs a single PNP transistor 32' connected to the supply lines and to the sensing line 27 to respond to a negative error signal. Conduction of transistor 32 establishes a logic "0" at its collector and thus an inverter state, as in detector 25, is not present. The collector of transistor 32' is connected directly as the input to the line 20' of "nor" logic unit 19.

The output of the inverter transistor 38 of logic unit 18 is connected by a coupling and input resistor 40 in input line 20 of the "nor" logic unit 18 which is illustrated in FIG. 2 as a PNP transistor 41 connected to the DC lines 33-35 is a common emitter configuration. The emitter 42 is connected directly to the ground line 35, while the collector 43 is connected to the negative supply line 34 in series with a load resistor 44 and the base 45 is connected through a resistor 46 to the positive line 33 of the DC supply.

The base 45 is also interconnected in common to the four input lines 20-23, each of which includes a corresponding resistor 40, 47, 48 and 49 to provide separate input channels to the base circuit.

The bias on the transistor 41 is such that in the absence of a logic "1" input signal, it is cut off and essentially non-conducting. The collector is then at a negative voltage level corresponding to a logic "1" output. The logic "1" signal at any one of the four inputs, however, turns the "nor" transistor on, resulting in the level of the collector rising essentially to ground level and thus to a logic "0" level. The only unique case is when all four inputs have a logic "0" applied thereto.

The second coupling resistor 47 is interconnected to the zero cross-over detector 29 which senses the presence of current between the supply to either one of the bridge networks 6 and 7.

In the illustrated embodiment of the invention, the cross-over detector 29 includes three transistor stages.

A first transistor 50 of the PNP type is connected as an emitter follower to the DC supply lines 33-35 and in particular has its base interconnected to a plurality of control signals. The emitter of the emitter follower transistor 50 is connected to the power in series with a resistor 51 and a timing capacitor 52 to ground. A first coupling resistor 53 in series with a blocking diode 54 is connected to the current sensing unit to establish a control signal if armature current flows in any or all of the three power supply lines 9.

The emitter follower transistor couples the current signal into a zero current detector transistor 55 which is connected in a common emitter configuration to the DC supply lines with the base connected in series with a resistor 56 to the junction of resistor 51 and timing capacitor 52. A Zener diode 57 is connected in parallel with the capacitor 52 and limits the capacitor bias voltage to the Zener voltage. When the emitter follower transistor 50 is biased to conduct, current flows through the capacitor 52 and the resistor 51 providing increasing negative charge on the base of transistor 55 with respect to the ground potential. Transistor 55 is a PNP type and is normally biased off and the collector is held at a negative potential and logic "1." When the level of the capacitor voltage reaches a selected voltage, the detector transistor 55 is biased to conduct such that its collector rises toward ground or relatively logic "0" level.

The output of the detector transistor 55 is connected through a further time delay and filter network to an inverter transistor 58 to establish a proper logic signal to the "nor" units 18 and 19 and the zero detector gates 28 and 28', as presently described.

The time delay filter network includes a pair of resistors 59 and 60 connected between the collector of transistor 55 and the base of the inverter transistor 58 and a capacitor 61 connected between the junction of the two resistors and ground line 35. In the absence of the conduction through the transistor 55 as a result of zero current condition, the capacitor 61 will charge to a selected voltage and bias transistor 58 on with creation of a logic "0" at the collector which is connected to the second coupling resistor 47 through gate 28. This thus establishes the second zero condition for "nor" unit 18.

The emitter follower transistor 50 also has its base connected to the output of the two logic "nor" circuits 18 and 19 to further interlock circuit operation, as presently described.

A coupling resistor 62 interconnects the base of transistor 50 directly to the collector of the "nor" logic transistor 41 and a second coupling resistor 63 similarly connects the base to the collector of the other "nor" logic unit 19. If either of the latter two inputs is at a positive logic "1," the transistor 50 is biased on even though a zero current condition exists and the transistor creates a logic "1" level to drive transistor 55 on and transistor 58 off, thereby creating a logic "1" input to the second input lines of "nor" circuits 18 and 19. The current detector output will therefore be a zero if and only if all three inputs to transistor 50 are logic "0." This condition occurs only when both of the "nor" circuits 18 and 19 have been disabled and establish a zero output and simultaneously therewith the armature current is zero. Further, when this condition is created, the switching action is not instantaneous, but is delayed by the discharge time of the capacitors 52 and 61. The effect of the total delay is to insure a five millisecond period, or other selected time, exists between the disabling of one bridge and the enabling of the other. The delay is to permit rapid changes in polarity of the error signal and is sufficiently long to insure a safe cross-over without appreciably or significantly affecting the control. If the error signal changes polarity very slowly, such time delay circuitry can be eliminated. In an actual circuit construction, applicant has designed the circuit to respond to a bridge current which is less than 2% of rated current and further included a programmed time delay to prevent cross-over for five milliseconds.

The output of the zero detector inverter transistor 58 is connected to "nor" units 18 and 19 through the gates 28 and 28' which are also connected to the output of the "nor" units to maintain an established triggered "nor" signal from transistor 41. The gates 28 and 28' are similarly constructed and gate 28 is shown and described in detail. The gates 28 is a PNP transistor 64 connected to the ground line 35 and the positive line 33 to back bias the transistor. The collector supply for transistor 64 is from the zero detect inverter transistor 58, the collector of which is connected to transistor 64 in series with the load resistor 65. The collector of the gate transistor 64 is connected to the third coupling resistor 48 for the corresponding "nor" logic transistor 41.

The base of the gate transistor 64 is connected through a coupling resistor 66 to the feedback line 30 of the corresponding "nor" logic transistor 41, as also shown in FIG. 1.

The pair of transistor gates 28 and 28' have the collector supply controlled simultaneously by the presence or absence of armature current. The gate transistor 64 is normally off and thus the logic signal to the "nor" transistor 41 is controlled by the zero current detector 29 through the control of the collector supply. When a "nor" transistor 41 is fired by the unique condition, and provides a logic "1" at line 30, transistor 64 is driven to conduct and its collector is connected to ground, thereby producing a logic "0" to hold the enabling condition independently of the detector 29.

In summary, only when armature current drops below a selected minimal level and essentially is zero and both of "nor" transistors 41 and 41' are disabled, is the circuit trigered to provide a logic "0" to the transistor and to supply gate collector voltage permitting lock-in conduction of the gate transistors. Further, which of the two transistors is locked in is determined by the output state of the two "nor" logic circuits. The circuit thus functions to insure that a bridge network 6 or 7 is enabled only after the disabling of the opposite bridge network and further insuring bridge current is zero.

The third coupling resistor 48 is interconnected to the feedback line 30' and thus to the collector of the opposite "nor" logic transistors 41' to provide an interlock directly between the two units 18 and 19. Thus, when one of the "nor" transistors 41 is presented with the unique input condition of four zeros, its logic signal is driven to a negative voltage and thus a logic "1" level. This logic "1" signal is applied to the base of the opposite transistor 41' which prevents presentation of the unique condition to such other "nor" logic unit 19.

The fourth input resistor 49 for the "nor" logic transistor 41 is interconnected directly to the fault or continuous disable circuit unit 31.

In summary, the "nor" logic transistor 41 maintains a logic "0" output as long as there is a logic "1" at any one of the four inputs. The output of the "nor" logic transistor 41 is fed into a logic converter transistor 67 shown as an NPN transistor in a common emitter connection to provide a positive logic signal in the presence of a negative logic signal and a logic "0" in response to a logic "0" input. The output of transistor 67 is connected to drive a power transistor 68 which also inverts the logic signal to establish a proper polarity for driving of a given gating circuit, not shown.

The output of the converter transistor 67 is interconnected to the regulator 10 through a blocking diode 69. The logic is established such that a logic "1" disables the bridge network while a logic "0" enables the corresponding bridge network.

In the illustrated schematic circuit of FIG. 2, a lamp driver transistor 70 is also connected to the output of the logic converter transistor 67 and interconnected to drive a lamp 71 for indicating which of the two bridges is enabled.

The operation of the illustrated embodiment of the invention is summarized with respect to the illustrations of FIGS. 1 and 2 as follows.

The command signal unit 11 is set at a given positive voltage to establish a forward direction of motor rotation or a negative command signal voltage to establish an opposite motor rotation. It will be assumed that the motor is in operation as a result of a previous setting of the circuit in order to eliminate the necessity for considering any particular start circuit which will normally form a part of the amplifier connection to prevent damping error signal condition. The output of the error operational amplifier 13 will therefore be an error signal proportional to the difference between the desired operational condition and the actual condition as reflected by the armature voltage signal applied to the operational amplifier. The amplified error signal is simultaneously fed to the summing operational amplifier 14 and to the polarity detector units 25 and 26. The summing operational amplifier 14 provides an output signal which is proportional to the summation of the armature counterelectromotive voltage and the error signal to provide the desired gating during each half-cycle of the input to the gated rectifier bridge networks to maintain proper armature current.

The signal applied to the detectors and particularly the transistors will determine which of the two bridge networks is to conduct.

Assume for purposes of description that an error signal of a positive polarity is present and applied to the corresponding bases of the detector transistors 32 and 32'. As a result, the transistor 32' for the one bridge is biased off and its output will consequently maintain a logic "1" at the base of the corresponding logic transistor, not shown, of unit 19 and maintained a logic "1" output preventing enabling of the corresponding bridge network 7.

The positive signal at the base of the PNP logic transistor 41 causes it to conduct, thereby generating a logic "0" at its collector which turns or inverts transistor 38 and establishes a logic "0" at the input line 20 of the corresponding "nor" logic transistor 41'. The second input line 21 is held at a logic "0" by the conduction of the gate transistor 64 of gate 28. The third input line 22 which is connected to the feedback line 30' of the opposite "nor" logic unit 19 is also at a logic "0." Assuming no fault conditions, the fourth input line is at logic "0." The combination of four logic "0" 's to the "nor" logic transistor 41 drives it off, and the output rises to a logic "1." This logic "1' is fed back through the coupling resistor to the opposite "nor" unit 19 to positively hold it in the off condition. It is simultaneously fed to the logic converter transistor 67 and therefrom to the power transistor 68 and lamp driver transistor 70. The output of the power transistor 68 will, therefore, be a logic "0" providing an enabling input signal to the gating regulator 10 to allow transfer of firing pulses to the rectifier 8 of network 6 to establish forward directional current. Transistor 70 conducts and illuminates the lamp 71 thereby indicating the conduction of the bridge.

If the error signal now changes from the positive polarity through zero to a negative polarity, the detector transistor 32 is turned off and the opposite detector transistor 32' turns on. The transistors 32 and 32' are selected and connected such that the transistor 32 turns off immediately while the opposite transistor 32' delays turn-on. A similar action occurs when changing from a negative to a positive polarity signal. Consequently, there is a voltage region about zero when both of the transistors 32 and 32' are in the off condition. During this short period, both of the logic transistors 41 and 41' are driven into conduction and establish a logic "0" output. As a result, the output feedback lines 30 and 30' simultaneously establish logic "0" to the input lines 22 and 22' and also a logic "0" to the zero current detector transistor 50 and the gate transistor 64 and 64'. If, or when, the armature current is also at zero, or essentially zero, the emitter follower transistor 50 conducts and charges capacitor 52.

As a result of the timing capacior 52, the switching action of transistor 55 is delayed. After the time delay, however, the zero current transistor 55 conducts and switches from a logic "0" output to a logic "1," resulting in the discharging of the second capacitor 61. This establishes a second time delay before actuation of the zero detect inverter transistor 58. During this whole period of time, it should be noted that both of the "nor" logic transistors 41 and 41' are in the bridge-off condition as a result of the switching characteristic of the polarity detector transistors 32 and 32'. After the time delay period, the transistor 58 switches on and establishes "0" output, and thereby removes the collector voltage to the gate transistors 64 and 64' and a logic "0" to the second inputs of the "nor" units 18 and 19.

At this time both transistors 64 and 64' are biased off as a result of the logic "0" from the "nor" units 18 and 19. At the end of switching time of the polarity detector transistors 32 and 32', the logic "1" is maintained by transistor 32, while the second transistor 32' conducts an destablishes a logic "0" at the corresponding input line 20'. Consequently, all of the inputs to the alternate logic unit 19 are at a logic "0," and a logic "1" output is established which is fed back into the opposite "nor" logic circuit to hold it off, and simultaneously is fed back into the base of the gate transistor 64' to bias it on. Transistor 64' therefore maintains the desired logic "0" output, even after the zero detect unit resets by turn-off of transistor 58 to supply the collector voltage. The logic from unit 19 is fed back as an input to the unit 18 to hold it at logic "0." The output of the second logic transistor is therefore now connected to drive and enable the corresponding bridge.

The two channels, in combination with the zero detect circuit, therefore provide a means for sensing the polarity of the error signal and conditioning the proper bridge network for conduction to reduce the error signal. It further insures that a bridge network will be enabled only after the opposite bridge has been disabled and further that the current and other circuit conditions are such to permit safe changeover from the network to the other.

Various modes of carrying out the invention are contemplated as being within the scope of the following claims, particularly pointing out and distinctly claiming the subject matter which is regarded as the invention.

I claim:

1. A D.C. energizing circuit from an A.C. source having a first rectifying means interconnected to the load for successive half cycles to conduct current in a first direction and a second similar rectifying means connected to the load in parallel with said first means and conducting current in a second and opposite direction to the load, said rectifying means being phase controlled to conduct and thereby operatively complete the connection, the improvement comprising a direction control means having a first input related to the desired direction and magnitude and a second input connected to the load and a summation means establishing an error signal having a polarity related to the necessary current direction in said load, a logic circuit means having a plurality of inputs and an output for each of said rectifying means for selectively firing only one of said rectifying units at any given time, said logic circuit having a first input means connected to bias a selected one of said rectifying means to conduct, a second input means connected to said direction control means and operable to selectively enable one of said rectifying means and simultaneously disable the other of said rectifying means, and a current sensing means connected to sense the presence of current supplied to either of said rectifying means and thereby transfer from one rectifying means to another in response to a selected current.

2. The energizing circuit of claim 1, wherein said direction control means establishes an error signal having a polarity related to whether the load energization is above or below a set value and including a fault sensor connected to said energizing circuit to detect a selected abnormal condition, said logic circuit having a third input means connected to said fault sensor to disable both of said rectifying means in response to said abnormal condition.

3. The energizing circuit of claim 1, wherein said circuit includes a pair of multiple input logic means, one for each of said rectifying means, said current sensing means including a first gate means for one channel and a second gate means for the second channel wherein said gate means are solid state amplifying devices connected to bias power supply means, current sensing input means connected to said bias power supply means and establishing a first signal in response to sensing said selected current and a second and different signal in the absence of sensing said selected current, and means connecting said gate means to said current sensing input means and to the corresponding logic means to selectively and sequentially actuate one of said logic means and the corresponding gate means in response to said second and different signal.

4. The energizing circuit of claim 3, wherein each of said gate means includes a gate transistor with output elements connected to said bias power supply means and input elements connected to the output of said corresponding logic means, and said current sensing input means including a multiple stage transistor circuit having input elements connected in common to a feedback means associated with said rectifying means and to output means of both of said logic means.

5. The energizing circuit of claim 4, wherein said transistor circuit includes an emitter follower transistor having said input elements, a zero current detector transistor connected to the output of said emitter follower transistor, and means connected between the detector transistor and both of said gate transistors and operable to selectively ground the power supply means and thereby control the signal to the logic means.

6. The energizing circuit of claim 4, wherein said transistor circuit includes an emitter follower transistor having said elements, a first time delay circuit connected to the output of the emitter follower transistor, a zero current detector transistor connected to said time delay circuit, a second time delay circuit connected to the output of the zero current detector transistor, and an output transistor connected to said second time delay circuit and to said gate transistors, said output transistor being connected to selectively ground the power supply means and thereby control the signal to the logic means.

References Cited

UNITED STATES PATENTS

| 2,711,505 | 6/1955 | Hoover | 321—13 |
| 3,315,143 | 4/1967 | Lawrence et al. | 321—13X |
| 3,320,514 | 5/1967 | Lawrence | 321—13UX |
| 3,399,337 | 8/1968 | Stone | 321—5 |
| 3,467,850 | 9/1969 | Christiansen et al. | 321—13UX |
| 3,478,257 | 11/1969 | Kyr et al. | 321—11 |

FOREIGN PATENTS

| 1,175,356 | 8/1964 | Germany | 321—5 |

WILLIAM H. BEHA, JR., Primary Examiner

U.S. Cl. X.R.

318—257; 321—27

UNITED STATES PATENT OFFICE
CERTIFICATE OF CORRECTION

Patent No. 3,551,782            Dated December 29, 1970

Inventor(s) JOHN T. MAYNARD

It is certified that error appears in the above-identified patent and that said Letters Patent are hereby corrected as shown below:

Column 1, Lines 36 - 55, delete the following paragraphs:
(See Amendment, January 13, 1970)

"A cross-over control includes a pair of "nor" transistors, each having a plurality of inputs and a digital signal output for positively enabling or disabling the corresponding bridge rectifier. A zero current detector is interconnected to the incoming power supply lines and provides a common zero motor current signal simultaneously applied to corresponding inputs of the two "nor" circuits via individual transistor gates. The gates are conjointly controlled by the detector and by an output signal from the corresponding "nor" unit.

"The polarity detectors are separately connected to corresponding "nor" transistors and the output of each "nor" transistor is interconnected as an input to the opposite transistor.

"A fault detector is also provided and connected as a fourth logic input to both "nor" transistors.

"A bridge rectifier is enabled when all of the logic signals to a coeresponding logic transistor are the same such that only one bridge is on at a time and a new bridge cannot conduct before a previous bridge is disabled."

Column 2, Line 25,      after "of" cancel "he"
(See Page 2, Line 11,      and insert --- the ---.
    of application)

Page - 1 -

UNITED STATES PATENT OFFICE
CERTIFICATE OF CORRECTION

Patent No. 3,551,782                    Dated December 29, 1970

Inventor(s)  JOHN T. MAYNARD

It is certified that error appears in the above-identified patent and that said Letters Patent are hereby corrected as shown below:

(Continuation)

Column 2, Line 33,    cancel "circuit" and insert
    (Page 2, Line 19,    --- current ---.
      of application)

Column 3, Line 15,    cancel "illustrates" and
    (Page 4, Line 8,    insert --- illustrate ---.
      of application)

Column 4, Line 41,    cancel "simlarily" and
    (Page 7, Line 14,    insert --- similarly ---.
      of application)

Column 4, Line 55,    cancel "coresponding" and
    (Page 7, Line 27,    insert --- corresponding ---.
      of application)

Column 5, Line 51,    cancel "is" and insert
    (Page 10, Line 2,    --- in ---.
      of application)

Column 7, Line 35,    cancel "trigered" and insert
    (Page 14, Line 11,    --- triggered ---.
      of application)

Column 7, Line 45,    cancel "transistors" and
    (Page 14, Line 21,    insert --- transistor ---.
      of application)

UNITED STATES PATENT OFFICE
CERTIFICATE OF CORRECTION

Patent No. 3,551,782          Dated December 29, 1970

Inventor(s) JOHN T. MAYNARD

It is certified that error appears in the above-identified patent and that said Letters Patent are hereby corrected as shown below:

(Continuation)

Column 8, Line 34,            cancel "maintained" and
    (Page   16, Line 24,            insert --- maintain ---.
        of application)

Column 9, Line 21,            cancel the phrase "an
    (Page   18, Line 26,            destablishes" and insert
        of application)              --- and establishes ---.

Claim 1,
    Column 9, Line 73,            after "and" and before
    (See Amendment "A" of         "thereby" insert ---
       January 13, 1970)            connected to said input
                                                means to prevent conduc-
                                                tion of either rectifying
                                                means and ---.

Signed and sealed this 22nd day of June 1971.

(SEAL)
Attest:

EDWARD M. FLETCHER, JR.                  WILLIAM E. SCHUYLER, JR.
Attesting Officer                          Commissioner of Patents